US006665010B1

(12) United States Patent
Morris et al.

(10) Patent No.: US 6,665,010 B1
(45) Date of Patent: Dec. 16, 2003

(54) CONTROLLING INTEGRATION TIMES OF PIXEL SENSORS

(75) Inventors: Tonia G. Morris, Chandler, AZ (US); Cynthia S. Bell, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/120,251

(22) Filed: Jul. 21, 1998

(51) Int. Cl.[7] .......................... H04N 5/335; H04N 5/235
(52) U.S. Cl. ....................... 348/297; 348/362; 348/301; 348/308
(58) Field of Search ................................. 348/296, 297, 348/302, 304, 362, 308, 363, 301; 396/96

(56) References Cited

U.S. PATENT DOCUMENTS

| | | | | |
|---|---|---|---|---|
| 4,573,077 A | * | 2/1986 | Imai ............................ | 348/307 |
| 5,008,698 A | * | 4/1991 | Muramatsu et al. ......... | 396/234 |
| 5,262,871 A | * | 11/1993 | Wilder et al. ............... | 348/308 |
| 5,353,058 A | * | 10/1994 | Takei ........................... | 348/363 |
| 5,414,487 A | * | 5/1995 | Iwasaki ....................... | 396/234 |
| 5,418,565 A | * | 5/1995 | Smith .......................... | 348/273 |
| 5,436,662 A | * | 7/1995 | Nagasaki et al. ............ | 348/312 |
| 5,497,215 A | * | 3/1996 | Iwasaki ....................... | 396/234 |
| 5,541,654 A | * | 7/1996 | Roberts ....................... | 348/301 |
| 5,615,399 A | * | 3/1997 | Akashi et al. ............... | 348/247 |
| 5,734,426 A | * | 3/1998 | Dong ........................... | 348/297 |
| 5,812,191 A | * | 9/1998 | Orava et al. ................. | 348/308 |
| 5,872,596 A | * | 2/1999 | Yanai et al. ................. | 348/297 |
| 5,943,514 A | * | 8/1999 | Sato et al. ..................... | 396/96 |
| 6,148,113 A | * | 11/2000 | Wolverton et al. .......... | 382/255 |
| 6,180,935 B1 | * | 1/2001 | Hoagland .................... | 348/297 |
| 6,255,638 B1 | * | 7/2001 | Eraluoto et al. ......... | 250/208.1 |
| 6,337,713 B1 | * | 1/2002 | Sato ............................. | 348/311 |
| 2002/0001037 A1 | * | 1/2002 | Miyawaki et al. .......... | 348/302 |

* cited by examiner

*Primary Examiner*—Vu Le
*Assistant Examiner*—Lin Ye
(74) *Attorney, Agent, or Firm*—Trop, Pruner & Hu, P.C.

(57) ABSTRACT

An imager includes groups of pixel sensing units and a control circuit. Each group of the pixel sensing units integrates photons from a different associated portion of an optical image over an integration interval for the group. The control circuit independently regulates the integration intervals for the groups. Photons from an optical image may be integrated to capture a pixel image. An energy may be determined by the integration, and times for the energy to reach different predetermined threshold levels may be measured. The duration of the integration may be regulated based on the measured times.

18 Claims, 6 Drawing Sheets

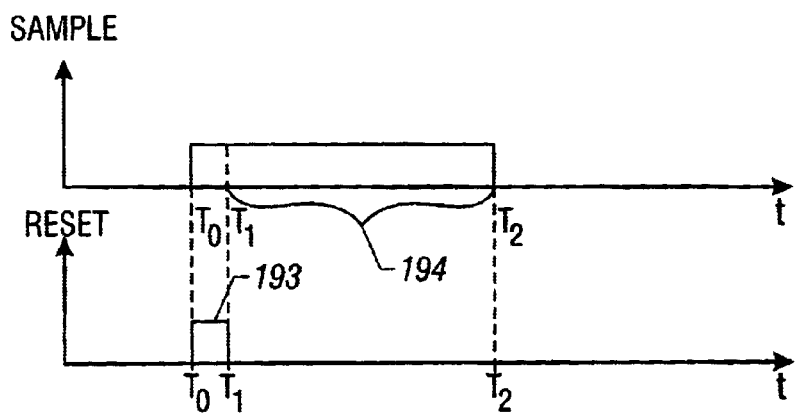
FIG. 10
FIG. 11
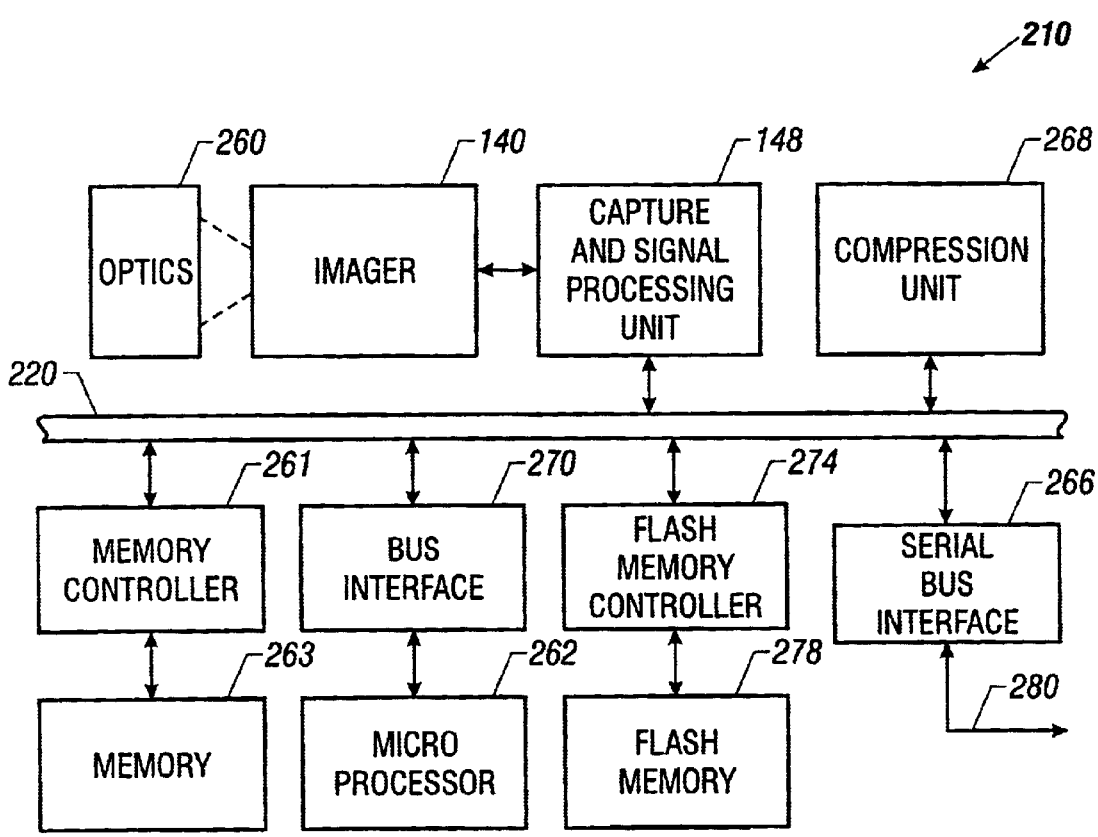
FIG. 12

CONTROLLING INTEGRATION TIMES OF PIXEL SENSORS

BACKGROUND

The invention relates to controlling integration times of pixel sensors.

Referring to FIG. 1, a typical digital camera 12 uses an imager 18 to electrically capture an optical image 11. To accomplish this, the imager 18 typically includes an array 13 (see FIG. 2) of photon sensing, pixel sensors 20. During an integration time, or interval, each pixel sensor 20 typically measures the intensity of a portion, or pixel, of a representation of the image 11 that is focused (by optics of the camera 12) onto the array 13. To accomplish this, the pixel sensor 20 accumulates light energy that is received from the associated pixel and at the expiration of the integration interval, indicates (via an analog voltage, for example) the accumulated energy which also, in turn, indicates an intensity of light of the pixel.

The camera 12 typically processes the indications from the pixel sensors 20 to form a frame of digital data (which digitally represents the captured image) and transfers the frame (via a serial bus 15, for example) to a computer 14 for processing. For video, the camera 12 may successfully capture several optical images and furnish several frames of data, each of which indicates one of the captured images. The computer 14 may then use the frames to recreate the captured video on a display 9.

Referring to FIG. 2, the sensors 20 may be arranged in rows and columns. This arrangement allows column 22 and row 24 decoders to selectively retrieve the indications from the sensors 20 after the integration interval. The decoders 22 and 24 route the selected indications to signal conditioning circuitry 26 which might include, for example, analog-to-digital converters (ADCs) and circuitry to compensate for noise that is introduced by the sensors 20. The signal conditioning circuitry 26 may furnish the resultant data signals to an output interface 28 which includes circuitry for interfacing the imager 18 to other circuitry of the camera 12. A control unit 30 may coordinate the above-described activities of the imager 18.

The duration of the integration interval determines how long the pixel sensors 20 sense, or are exposed to, the optical image 11. In this manner, if the duration of the integration interval is too short, the pixel sensors 20 may be underexposed, and if the duration is too long, the pixel sensors 20 may be overexposed.

The camera 12 typically controls the duration of the integration interval based on the camera's measurement of the brightness of the optical image 11. In this manner, for bright lighting conditions, the camera 12 uses a shorter duration (to prevent overexposure of the pixel sensors 20) than for low lighting conditions (to prevent underexposure of the pixel sensors 20). The camera 12 may measure the brightness of the image based on a histogram of sampled intensities.

The histogram represents a distribution of intensity levels of the pixel image over an available dynamic range (a range spanning from an intensity level of 0 to an intensity level of 255, for example). If the intensity levels are distributed over a large portion of the available dynamic range, then the image appears more vivid than if the intensity levels are distributed over a smaller portion of the available dynamic range. For example, a histogram 40 (see FIG. 3) for an image having an unacceptably low contrast exhibits a higher concentration of the lower intensities than a histogram 41 (see FIG. 4) for an image that has an acceptable contrast and thus, a larger dynamic range.

For purposes of determining the proper duration for the integration interval, the camera 12 may enter a calibration, or premetering, mode during which the camera 12 uses an iterative process to determine the duration. The camera 12 typically chooses a predetermined duration of the integration interval to sample intensities of the image 11 by using a small group of the pixel sensors 20. In this manner, the camera 12 may statistically evaluate a histogram of these intensities and based on this evaluation, upwardly or downwardly adjust the predetermined duration before sampling intensities again. The camera 12 continues the iterations until the camera 12 determines the duration of the integration interval is appropriate. However, this iterative process may consume a significant amount of time which may adversely affect the click-to-capture performance time of the camera. Furthermore, this delay may prevent the camera 12 from responding to changing lighting conditions in a timely fashion.

As described above, the camera 12 may set the duration of the integration interval based on the intensities indicated by a small group of the pixel sensors 20. However, the intensities sensed by this small group may not accurately represent the range of intensities of the optical image 11. For example, the small group may sense bright pixels of an otherwise dark image, and as a result, the camera 12 may use an integration interval that is too short to adequately capture the image.

Thus, there is a continuing need for a digital imaging system that addresses the to problems stated above.

SUMMARY

In one embodiment, an imager includes groups of pixel sensing units and a control circuit. Each group of the pixel sensing units integrates photons from a different associated portion of an optical image over an integration interval for the group. The control circuit independently regulates the integration intervals for the groups.

In another embodiment, a method includes integrating photons from an optical image to capture a pixel image. An energy that is indicated by the integration is determined. The times for the energy to reach different predetermined threshold levels are measured, and a duration of the integration is regulated based on the measured times.

BRIEF DESCRIPTION OF THE DRAWING

FIGS. 10 and 11 are illustrations of waveforms of signals used by the pixel sensing unit.

FIG. 12 is a schematic diagram of a camera according to an embodiment of the invention.

DETAILED DESCRIPTION

Figure 1:
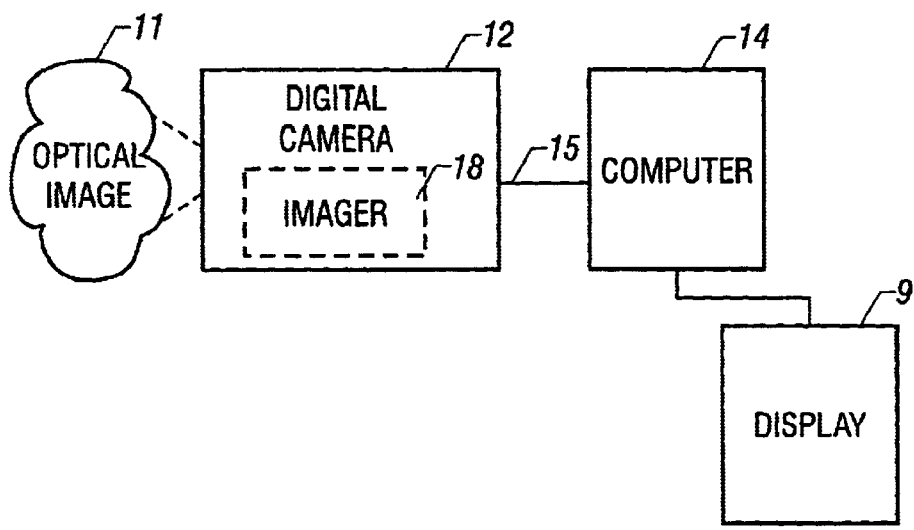
FIG. 1 is a schematic diagram of a digital imaging system of the prior art.
Figure 2:
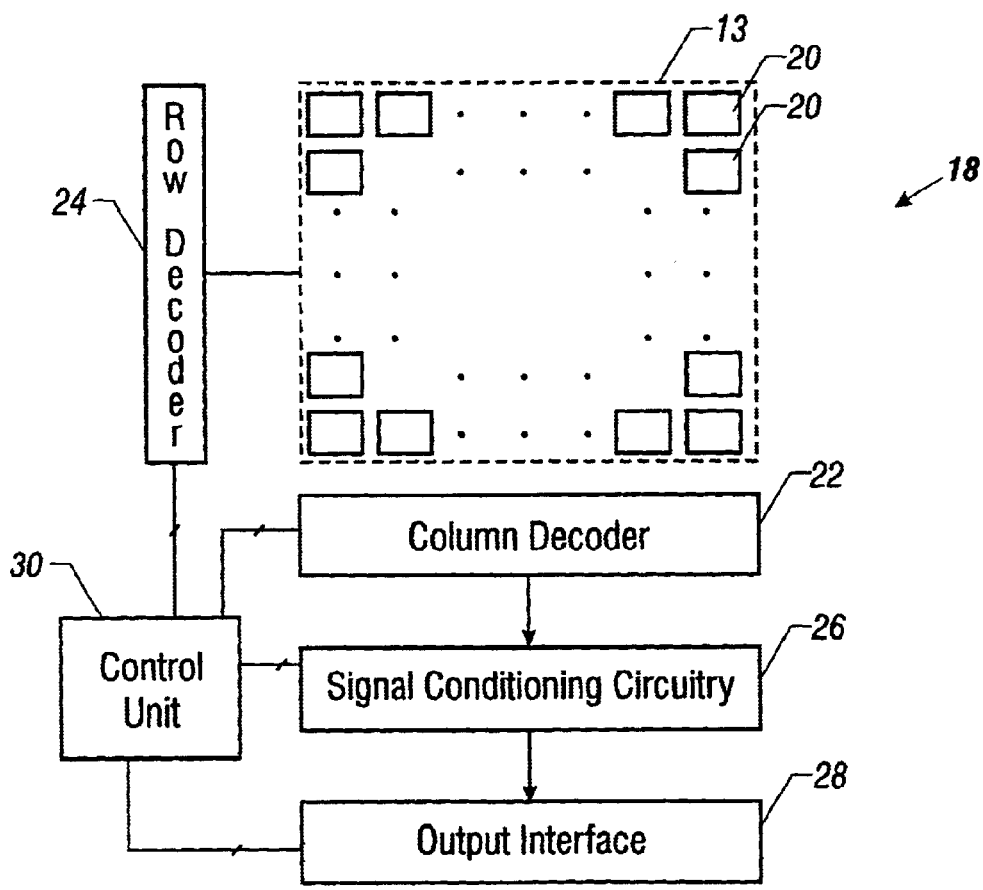
FIG. 2 is a schematic diagram of an imager of the system of FIG. 1.
Figure 3:
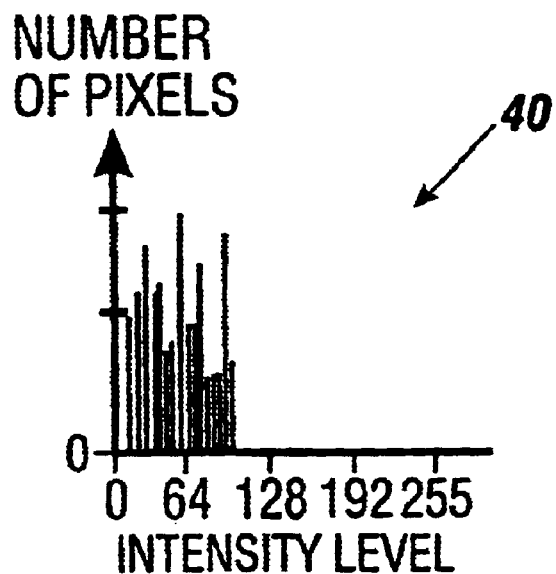
FIGS. 3 and 4 are histograms illustrating distributions of pixel intensities.
Figure 4:
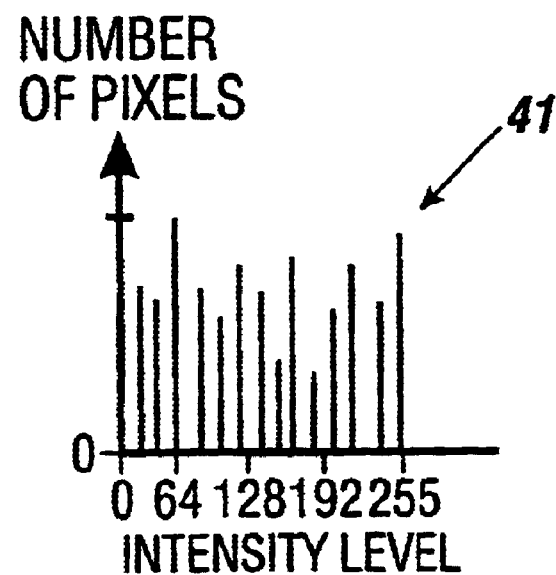
Figure 5:
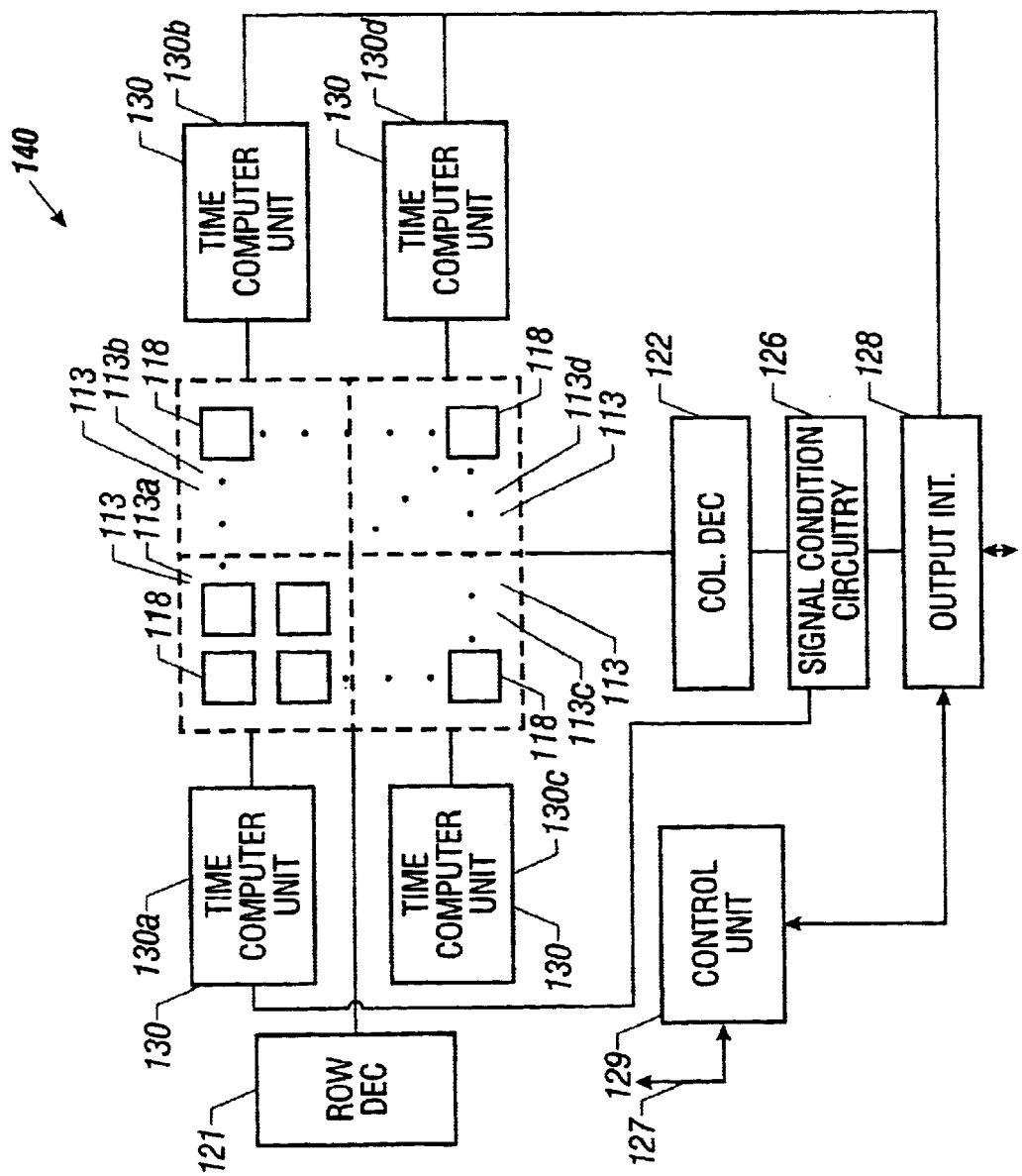
FIG. 5 is a schematic diagram of an imager according to an embodiment of the invention.

Referring to FIG. 5, an embodiment 140 of a digital imager in accordance with the invention includes an array of pixel sensing units 118 that are located in a focal plane onto which optical images to be captured are focused. In this manner, during an integration interval, or time, each pixel sensing unit 118 measures an intensity of light that strikes a portion, or pixel, of the focal plane. In some embodiments, the array is spatially divided into multiple (four, for example) groups 113 (groups 113a, 113b, 113c and 113d, as examples) of pixel sensing units 118, and the imager 140 independently sets the duration of the integration interval that is used by each group 113. Due to this independent control of the integration durations, the exposure time of each different group 113 may be adjusted to accommodate the brightness of a different portion of the optical image. As a result of this arrangement, a darker portion of the optical image may be captured by one of the groups 113 (using an integration interval having a longer duration) while another one of the groups 113 (using an integration interval having a shorter duration) captures a brighter portion of the optical image. Therefore, the regional (and not global) control of the integration intervals optimizes the dynamic range of the captured image.

In some embodiments, the groups 113 may be associated with different characteristics of the array. For example, a lens may concentrate brightness levels on the array in a pattern of concentric brightness circles. In this manner, the lens typically causes the inner circles to have higher brightness levels than the outer circles, and each group 113 may be associated with a different brightness circle. As another example, the groups 113 may be associated with different pixel colors sensed by the array. Thus, one group 113 may be associated with a red pixel color and one group 113 may be associated with a green pixel color.

Thus, the advantages of independently controlling integration times for different groups of pixel sensing units may include one or more of the following: contrast of the captured pixel image may be optimized; the available dynamic range of intensities for the captured pixel image may be maximized; large spatial variations in the intensities of the image may be accommodated; groups of pixel sensing units associated with concentric brightness rings caused by the lens may be accommodated; and groups of pixel sensing units associated with different pixel colors may be accommodated.

In some embodiments, durations of the integration intervals may be determined using conventional iterative techniques. However, in other embodiments, to determine the durations of the integration intervals for optimal exposures, the imager 140 may include four time measurement circuits 130a, 130b, 130c and 130d which aid in setting durations of the integration intervals for the groups 113a, 113b, 113c and 113d, respectively, as described below. The duration of the integration interval for a particular group 113 is determined during a premetering mode.

The premetering mode is to be contrasted to a normal mode during which the pixel sensing units 118 capture the optical image. The normal mode begins when the pixels sensing units 118 are globally initialized, or reset, and thereafter, the pixel sensing units 118 accumulate light energy over an integration interval that has a fixed duration. At the end of the integration interval, each pixel sensing unit 118 indicates an amount of accumulated energy and thus, indicates the intensity of the associated pixel. Thus, for example, a pixel sensing unit 118 that receive photons from a high intensity pixel accumulates more energy during the integration interval than a pixel sensing unit 118 that senses light from a lower intensity pixel.

Unlike the normal operation, during the permetering mode, the pixel sensing units 118 do not accumulate light energy over an integration interval that has a fixed duration. Instead, the time measurement circuit 130 (for one of the groups 113) measures times for the indicated intensities to reach a predetermined intensity threshold. To accomplish this, each pixel sensing unit 118 (after being initialized, or reset) monitors its indicated intensity and notifies (as described below) the time measurement circuit 130 when the indicated intensity exceeds the predetermined intensity threshold. In particular, the time measurement circuit 130 counts a number of the pixel sensing units 118 that have reached the intensity threshold and generates an energy time stamp to mark a time when the number exceeds a predefined number threshold. For example, if one of the number thresholds represents 1000 pixels, then the time measurement circuit 130 generates an energy time stamp to mark the time when 1000 of the pixel sensing units 118 indicate that the intensity threshold has been reached.

Figure 6:
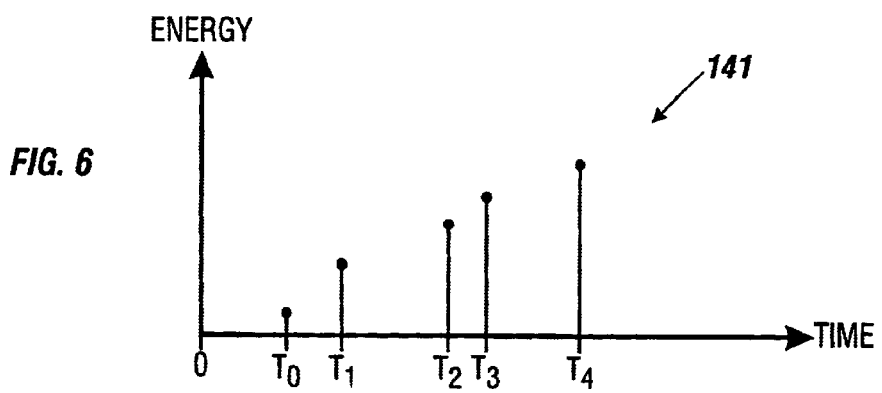
FIG. 6 is an illustration of a time-varying energy sensed by a group of pixel sensors.

Because, during the premetering mode, reaching the intensity threshold also indicates reception of a predetermined amount of light energy, the energy time stamps effectively indicate a plot 141 (see an exemplary plot in FIG. 6) of energy that has been received by one group 113. In this manner, each energy time stamp marks a time (times $T_0$, $T_1$, $T_2$, $T_3$ or $T_4$, as examples) at which an additional, discrete amount of energy has been accumulated by the pixel sensing units 118 of the particular group 113.

Thus, by using the energy time stamps, the energy received by group 113 may be monitored. For purposes of using the time stamps to set the duration of the integration interval, the energy may be evaluated to, for example, determine a time (called $T_{INT}$) when a predetermined percentage (ninety percent, for example) of the maximum possible energy has been received by the group 113. The maximum energy is approximately equal to product of the total number of all of the pixel sensing units 118 of the group 113 multiplied by the predetermined amount of energy that can be indicated by each pixel sensing unit 118. As a practical matter, in some embodiments, the time $T_{INT}$ may be determined by the time required for a predetermined percentage of pixel sensing units 118 to indicate that a predetermined intensity threshold has been reached.

Figure 7:
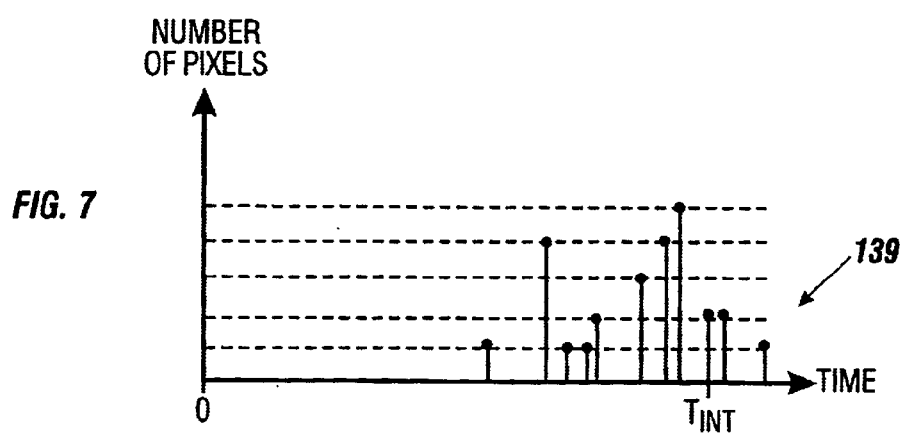
FIG. 7 is an illustration of a distribution of the energy over time.

Alternatively, the time stamps may be used to develop a distribution 139 (see FIG. 7) of the energy received by the pixel sensing units 118. The distribution 139 may be statistically evaluated to determine the optimal integration time. For example, a mean of the distribution 139 may be calculated and used to set the duration of the integration interval for the group 113.

Thus, for bright lighting conditions, the sensed light intensities rise rapidly to cause the times to be shorter and thus, cause the integration interval to be shorter. For low lighting conditions, the sensed light intensities cause the times to be longer and thus, cause the integration interval to be longer.

Because the entire group 113 of the pixel sensing units 118 is used to determine the integration interval, a few aberrations do not skew the results. For example, the imager 140 may capture an image of a car, and the car may have a reflective surface that directs a very bright light toward a few of the pixel sensing units 118. In this manner, if these pixel sensing units 118 were used to determine the duration of the integration interval, the integration interval might be too short, as the lighting for the entire image might be darker. However, by using the entire group 113, these peaks are averaged out by the intensities provided by the other pixel sensing units 118.

Among the advantages of using energy time stamps to set the duration of the integration interval may include one or more of the following: auto-exposure times for the imager may be evaluated quickly; only a single captured image may be used to set the duration of the integration interval; and a large representative sample of the pixels may be used.

Figure 8:
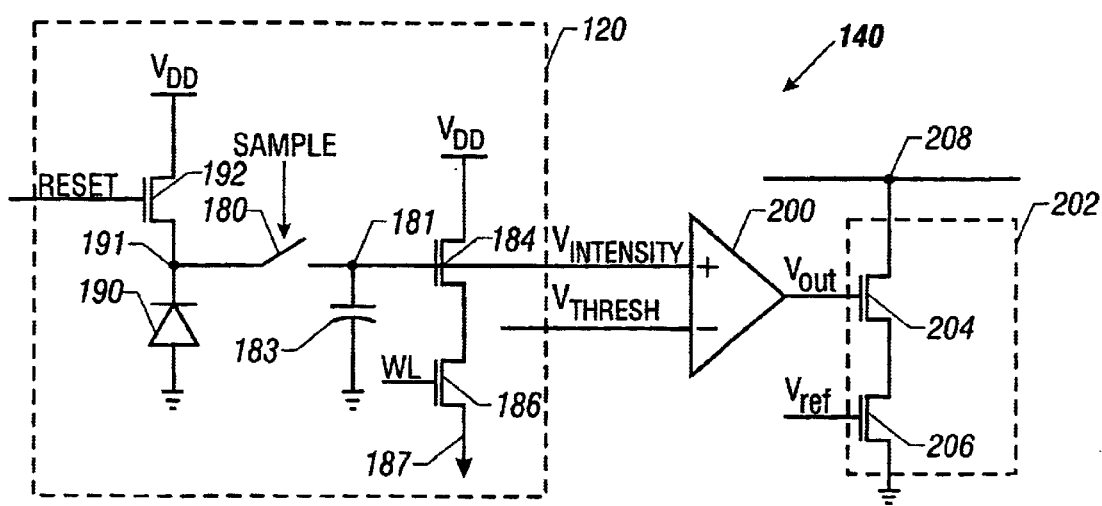
FIG. 8 is a schematic diagram of a pixel sensing unit of the imager.

Referring to FIG. 8, in some embodiments, each pixel sensing unit 118 includes an active pixel sensor 120 to sense the intensity of an associated pixel, a comparator 200 to compare the sensed light intensity to the predetermined intensity threshold, and a summer circuit 202 to aid in counting the total number of intensities that have reached the intensity threshold, as described below. The non-inverting input terminal of the comparator 200 receives a signal (called $V_{INTENSITY}$) from the pixel sensor 120 which indicates the sensed intensity level. The comparator 200 compares the $V_{INTENSITY}$ signal with a signal (called $V_{THRESH}$) to generate a signal (called $V_{OUT}$) which indicates the result of the comparison.

To count the number of intensities that have reached the predetermined intensity threshold, the imager 140 may include a summer which is collectively formed by the summer circuits 202 which are present in each pixel sensing unit 118. When the intensity level surpasses the predetermined intensity threshold, the summer circuit 202 conducts current to sink a predetermined amount of current from a common current node 208 that is coupled to all of the summer circuits 202. In this manner, the total number of intensity levels that have passed the predetermined intensity threshold may be determined by monitoring the current level of a line 209 (see FIG. 9) that is coupled to the node 208. A constant current source (not shown) may be coupled to provide a constant current to the node 208.

Figure 9:
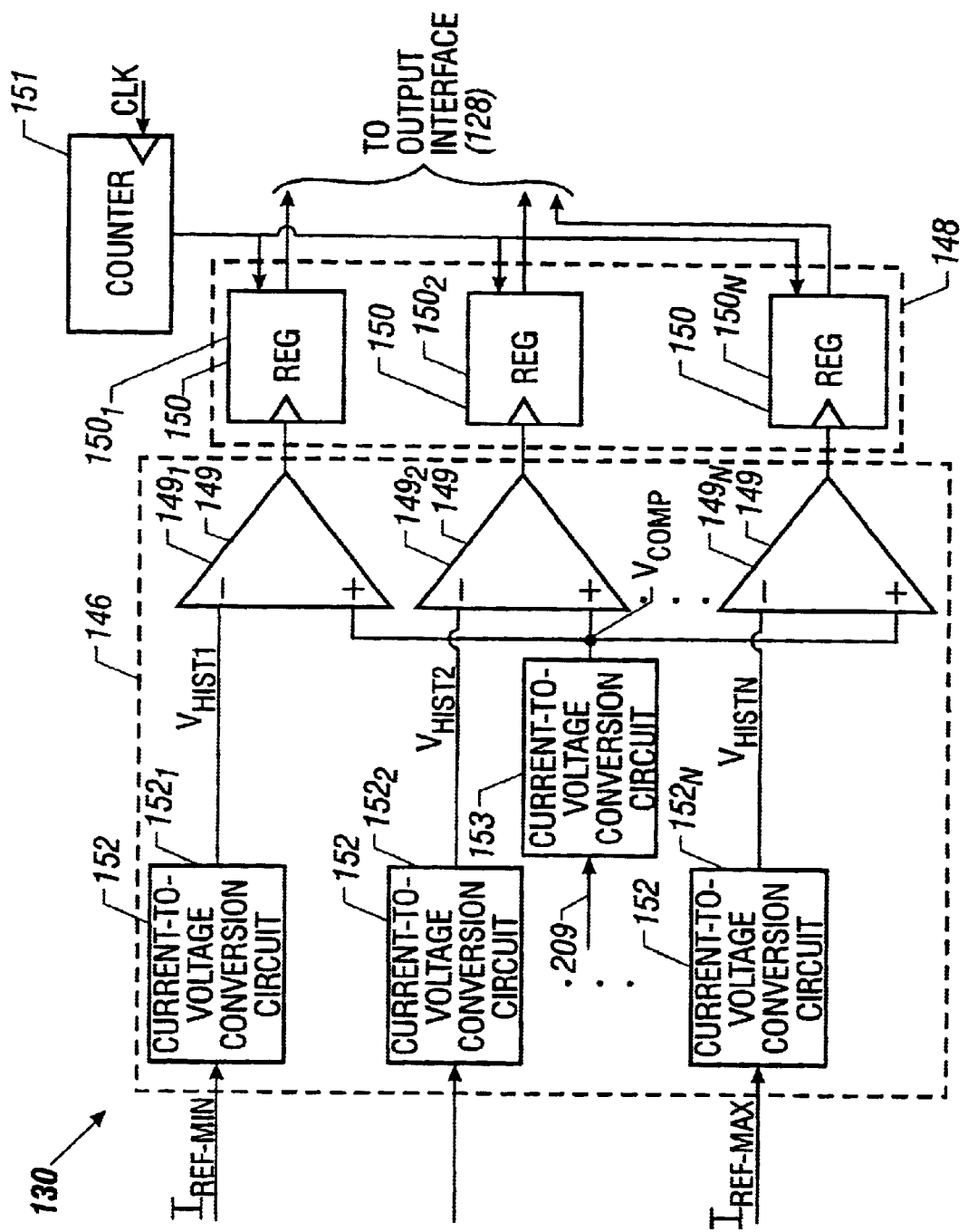
FIG. 9 is a schematic diagram of a time measurement circuit of the imager.

Referring to FIG. 9, in some embodiments, the time measurement circuit 130 includes a current-to-voltage conversion circuit 153 which converts the current level of the line 209 to a voltage signal (called $V_{COMP}$). The time measurement circuit 130 includes N histogram comparators 149 (comparators $149_1$, $149_2$, . . . $149_N$), each of which compares the $V_{COMP}$ signal to a different threshold voltage (voltages $V_{HIST1}$, $V_{HIST2}$, . . . $V_{HISTN}$, as examples). Each of the $V_{HIST1}$, $V_{HIST2}$, . . . $V_{HISTN}$ threshold voltages indicate a different threshold number. In this manner, when the $V_{COMP}$ signal surpasses one of these threshold voltages, the associated comparator 149 asserts (drives high, for example) its output signal. The output signal of each comparator 149, in turn, drives a load input of an associated register 150 (registers $150_1$, $150_2$, . . . $150_N$, as examples) of a time stamp circuit 148, which causes the register 150 to load a value provided by a clocked incrementing counter 151. In this manner, the value loaded from the counter 151 indicates the energy time stamp for when the number of pixel intensities exceed one of the numbers indicated by the associated threshold voltage $V_{HIST1}$, $V_{HIST1}$, . . . $V_{HISTN}$.

Each of the $V_{HIST1}$, $V_{HIST2}$, . . . $V_{HISTN}$ threshold voltages is provided by an associated current-to-voltage conversion circuit 152 (circuit $152_1$, $152_2$, . . . $152_N$, as examples) which converts a reference current into voltage. As examples of the numbers, a reference current (called $I_{REF\_MIN}$) might be received by the circuit $152_1$ and used to indicate 0.5% of the total number of pixel sensing units 118 of the group 113, and a reference current (called $I_{REF\_MAX}$) might be received by the circuit $152_N$ and used to indicate 99.5% of the total number of pixel sensing units 118 of the group 113.

The energy time stamps may be evaluated by a device (a microprocessor, for example) that is external to the imager 140. In this manner, the output terminals of the registers 150 may be coupled to an output interface 128 (see FIG. 5) of the imager 140. The external device may retrieve data (indicative of the energy time stamps) from the output interface 128, determine the durations of the integration intervals from the energy time stamps, and via the output interface 128, transmit indications of the durations to the control unit 129. In this manner, the control unit 129 transmits signals (described below) to the pixel sensing units 118 of the different groups 113 to independently control the durations of the integration intervals.

Referring to FIGS. 8, 10 and 11, the integration interval for each pixel sensing unit 118 is controlled in the following manner. The pixel sensing unit 118 may include a photosensitive element, such as a photosensitive diode 190, that is exposed at the focal plane of the imager 140 to sense light. The cathode of the diode 190 is coupled to ground, and the anode of the diode 190 is coupled to a sampling node 191. The control circuit 129 asserts (drives high, for example) a signal (called SAMPLE) to activate a switch 180 (an n-channel, metal-oxide-semiconductor field-effect-transistor, for example) to selectively couple the sampling node 191 to the storage node 181. The coupling of the two nodes 181 and 191 permits the current from the diode 190 to be integrated by a capacitor 183 during an integration interval 194. The integration of the current decreases the voltage of the node 181.

However, before the integration interval 194 begins, the storage node 181 is initialized with a positive initialization voltage. To accomplish this, an n-channel, metaloxide-semiconductor field-effect-transistor 192 has its drain-source path coupled between the sampling node 191 and a positive voltage supply level (called $V_{DD}$). The gate of the transistor 192 is driven by a reset signal (called RESET) which is briefly asserted (driven high, for example) by the control unit 129 (see FIG. 5) near the beginning of integration interval 194. In this manner, the control unit 129 pulses high the RESET signal near the beginning of the integration interval 194 to cause the transistor 192 to conduct and pull the voltage level of the sampling node 191 near the $V_{DD}$ positive voltage supply level. As a result, this brief pulse 193 causes the predetermined initialization voltage to be stored in the capacitor 183. After the pulse 193, the integration interval 194 begins, and the voltage of the node 181 decreases from the initialization voltage as the pixel sensor 120 accumulates energy. The integration interval 194 ends when the control circuit 129 deasserts (drives low, for example) the SAMPLE signal to decouple the nodes 181 and 191 from each other.

To transfer the analog voltage stored on the storage node 181 to a bit line 187, the pixel sensor 120 includes an n-channel, metal-oxide-semiconductor field-effect-transistor 186 that has its drain-source path coupled between the bit line 187 and a source of another n-channel, metal-oxide-semiconductor field-effect-transistor 184. The gate of the transistor 186 receives a signal (called WL) that is activated by a row decoder 121 to cause the transistor 187 to conduct and transfer an indication of the voltage of the storage node 181 to the bit line 187. The drain of the transistor 184 is coupled to the $V_{DD}$ voltage supply level, and the gate of the transistor 184 is coupled to the storage node 181. In this manner, the transistor 184 is arranged in a common source configuration to transfer an indication of the voltage of the node 181 to the bit line 187 when the transistor 186 conducts.

Referring back to FIG. 5, to take a snapshot of an image during the normal mode, the pixel sensing units 118 accumulate energy over the respective integration intervals to electrically indicate intensities for the captured image. Next, the row decoder 121 begins retrieving the stored indications of these intensities from the pixel sensing units 118 by selectively, electrically selecting rows of the pixel sensing units 118. Once selected, the pixel sensing unit 118 transfers the indication of its intensity value to signal conditioning circuitry 126. A column decoder 122 may be used to select groups of the indications for each row. The signal conditioning circuitry 126 may, for example, filter noise from the indications and convert the indications into digital data before transferring the data to an output interface 128. The output interface 128 may include buffers for temporarily storing data and circuitry to interface the imager 140 to external circuitry (other components of a digital camera, for example). The image 140 might also include, for example, the control unit 129 which has circuitry such as state machines and timers to control the scanning and data flow through the chip 54 and control the durations of the integration intervals that are set by the time measurement circuits 130.

The control unit 130 may also set the predetermined intensity threshold of each group 113 by setting the $V_{THRESH}$ voltage for each group. The $V_{THRESH}$ voltage is between a noise floor voltage and the initialization voltage (three volts, for example) that is stored on the storage node 181.

Referring to FIG. 12, in some embodiments, the imager 140 may be part of a digital camera 210. Besides the imager 140, the camera 210 may include optics 260 to focus the optical image onto the focal plane of the imager 140. A capture and signal processing unit 148 interacts with the imager 140 to capture the pixel image and transfer a frame of data that indicates the pixel image to a random access memory (RAM) 263. To accomplish this, the capture and signal processing unit 148 is coupled to a bus 220, along with a memory controller 261 which receives the frame from the bus 220 and generates signals to store the data in the memory 263.

The camera 210 may also include a compression unit 268 that may interact with the memory 263 to compress the size of the frame before storing the compressed frame in a flash memory 278. To accomplish this, the compression unit 268 is coupled to the bus 220, along with a flash memory controller 274 which receives the compressed frame from the bus 220 and generates signals to store the data in the flash memory 278. To transfer the compressed frame to a computer, the camera 210 may include a serial bus interface 266 that is coupled to the bus 220 to retrieve the compressed frame from either the memory 263 or the flash memory 278. To accomplish this, the serial bus interface 266 generates signals on a serial bus 280 (a Universal Serial Bus (USB), for example) to transfer the compressed frame to the computer.

The camera 210 may also include a microprocessor 262 that coordinates activities of the camera 210. To accomplish this, the microprocessor 262 is coupled to the bus 220 through a bus interface 270. In some embodiments, the microprocessor 262 interacts with the imager 140 (via the capture and signal processing unit 148) to retrieve indications of the energy time stamps for each group 113. After retrieving the time stamps, the microprocessor 262 may determine the durations of the integration intervals for the groups, as described above. In this manner,.once the durations are determined, the microprocessor 262 may interact with the imager 140 to transmit indications of the durations to the imager 140. The imager 140 then uses these indications to control the integration intervals of the groups 113, as described above.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An imager comprising:
  groups of pixel sensing units, each group of pixel sensing units to integrate photons from a different associated portion of an optical image over an integration interval for the group to provide indications of light intensities; and
  a circuit to independently regulate durations of the integration intervals for the groups in response to the indications of the light intensities;
  wherein each group is associated with a concentric brightness circle of a lens.

2. A camera comprising:
  groups of pixel sensing units, each group of pixel sensing units to integrate photons from a different associated portion of an optical image over an integration interval for the group to provide indications of light intensities;
  a control circuit to independently regulate the integration intervals; and
  a processor coupled to the control circuit to determine the durations of the integration intervals for the groups in response to the indications of the light intensities,
  wherein each group is associated with a concentric brightness circle of a lens.

3. An imager comprising:
  groups of pixel sensing units, each group of pixel sensing units to integrate photons from a different associated portion of an optical image over an integration interval for the group to provide indications of light intensities; and
  a circuit to independently regulate durations of the integration intervals for the groups in response to the indications of the light intensities, wherein each group is associated with a pixel color sensed by the group, the pixel color being different for each of the groups.

4. The imager of claim 3, wherein the groups sense red, green and blue pixel colors.

5. A camera comprising:
  groups of pixel sensing units, each group of pixel sensing units to integrate photons from a different associated portion of an optical image over an integration interval for the group to provide indications of light intensities;
  a control circuit to independently regulate the integration intervals; and
  a processor coupled to the control circuit to determine the durations of the integration intervals for the groups in response to the indications of the light intensities, wherein each group is associated with a pixel color sensed by the group, the pixel color being different for each of the groups.

6. The camera of claim 5, wherein the groups sense red, green and blue pixel colors.

7. A method comprising:

integrating photons from an optical image to capture a pixel image;

determining an energy indicated by the integration;

measuring times for the energy to reach different predetermined threshold levels; and regulating the duration of the integration based on the measured times.

8. The method of claim 7, wherein the act of integrating comprises:

indicating intensities of pixels of the optical image.

9. The method of claim 8, wherein the act of determining the energy comprises:

counting a number of the intensities that exceed a predetermined intensity threshold.

10. The method of claim 9, wherein the act of measuring times comprises:

determining when the number exceeds predetermined threshold numbers.

11. An imager comprising:

pixel sensing units, each pixel sensor to indicate a light intensity; and a measurement circuit to indicate a distribution of times for the indicated light intensities to reach a first predetermined intensity threshold.

12. The imager of claim 11, wherein the measurement circuit comprises:

comparators, each comparator to indicate when a different one of the light intensities exceeds the first predetermined intensity; and a summer coupled to the comparators to indicate a number of the intensities that exceed the predetermined intensity threshold.

13. The imager of claim 12, wherein the measurement circuit farther comprises:

additional comparators, each additional comparator coupled to the summer to compare the number to different predetermined number thresholds; and a time stamp circuit to, based on the comparisons by the additional comparators, indicate times at which the number exceeds the different predetermined number thresholds.

14. The imager of claim 13, wherein the time stamp circuit comprises:

registers individually activated by the additional comparators to load a clock signal when the number exceeds the different predetermined number thresholds.

15. A camera comprising:

pixel sensors, each pixel sensor to indicate a light intensity;

measurement circuit to indicate a duration for a predetermined number of the light intensities to exceed a predetermined intensity threshold; and a processor coupled to the measurement circuit to use the duration to establish an integration interval for the pixel sensors.

16. The camera of claim 15, wherein the measurement comprises:

comparators, each comparator to indicate when a different one of the light intensities exceeds the first predetermined intensity; and a summer coupled to the comparators to indicate how many of the intensities exceed the predetermined intensity threshold.

17. The camera of claim 16, wherein the measurement circuit further comprises:

a timer coupled to the summer to indicate the duration.

18. The camera of claim 17, wherein the timer comprises:

another comparator to compare the indication from the summer to an indication of the predetermined threshold; and a register to load a value indicative of a clock based on the comparison.

* * * * *

UNITED STATES PATENT AND TRADEMARK OFFICE
CERTIFICATE OF CORRECTION

PATENT NO.    : 6,665,010 B1  
DATED         : December 16, 2003  
INVENTOR(S)   : Tonia G. Morris and Cynthia S. Bell It is certified that error appears in the above-identified patent and that said Letters Patent is hereby corrected as shown below:

<u>Column 9,</u>  
Line 43, "farther" should be -- further --.

<u>Column 10,</u>  
Line 18, before "measurement", insert -- a --.

Signed and Sealed this

Twenty-fourth Day of February, 2004

JON W. DUDAS  
*Acting Director of the United States Patent and Trademark Office*